United States Patent [19]

Sherman

[11] 4,263,670

[45] Apr. 21, 1981

[54] MICROPROCESSOR DATA MODEM

[75] Inventor: James B. Sherman, Huntsville, Ala.

[73] Assignee: Universal Data Systems, Inc., Huntsville, Ala.

[21] Appl. No.: 38,310

[22] Filed: May 11, 1979

[51] Int. Cl.³ .......................... H04J 3/12; H04L 27/06
[52] U.S. Cl. ........................................ 375/9; 364/900; 375/67; 375/84
[58] Field of Search ................... 375/8, 9, 27, 67, 78, 375/79, 84, 85, 86, 53; 178/67.1; 179/2 DP; 364/900

[56] References Cited

U.S. PATENT DOCUMENTS

| | | | |
|---|---|---|---|
| 3,747,024 | 7/1973 | Choquet et al. | 375/67 |
| 3,818,347 | 6/1974 | Holsinger | 325/321 |
| 3,878,468 | 4/1975 | Falconer et al. | 325/320 |
| 3,988,540 | 10/1976 | Scott et al. | 375/53 |
| 4,027,250 | 5/1977 | Lang | 325/323 |
| 4,035,735 | 7/1977 | Akashi et al. | 325/476 |
| 4,085,449 | 4/1978 | Walsh et al. | 364/900 |
| 4,097,807 | 6/1978 | Fujimura | 325/42 |

OTHER PUBLICATIONS

"Microprocessor Implementation of High–Speed Data Modems", Van Gerwen et al., IEEE Transactions on Communications, vol. Com-25, No. 2, Feb. 1977.
Bell System Technology Reference—"Data Sets 201A and 201B".

Primary Examiner—Thomas A. Robinson
Attorney, Agent, or Firm—Weingarten, Maxham & Schurgin

[57] ABSTRACT

A data modem is provided which is operative at a data rate of 4800 bps and employing 8 phase DPSK modulation. The modem includes a microprocessor and associated memories for digital signal processing and control of substantially all transmitter and receiver operations.

12 Claims, 14 Drawing Figures

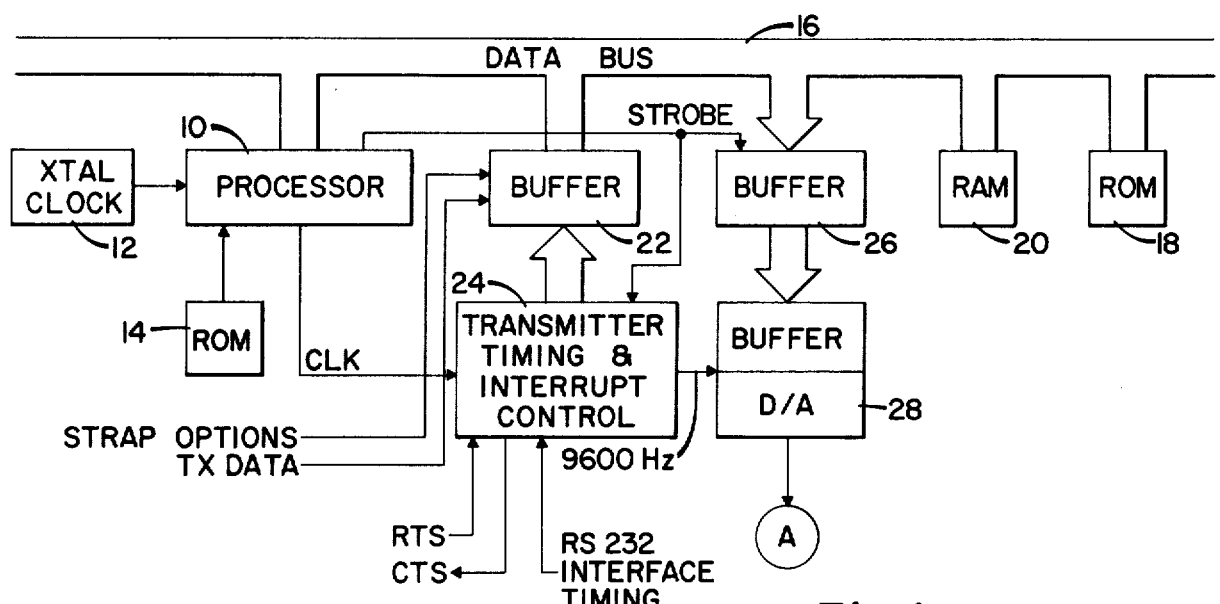
Fig. 1
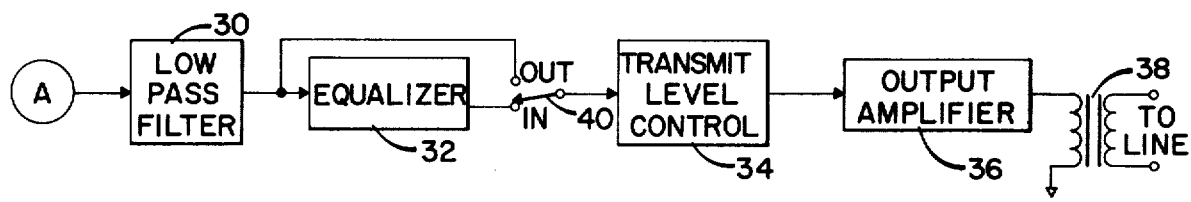
Fig. 2
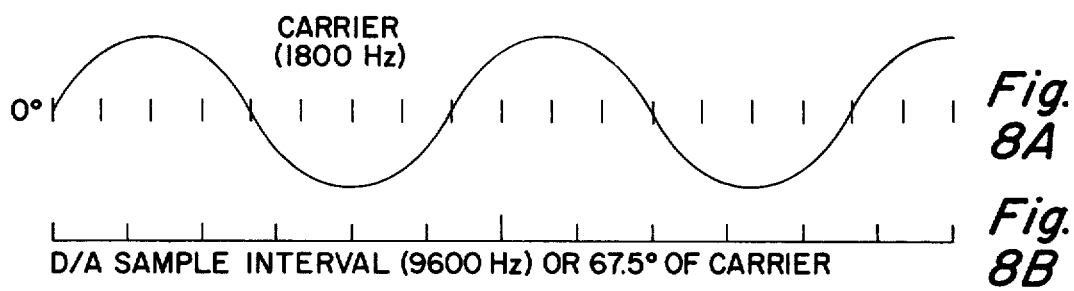
Fig. 8A
Fig. 8B
Fig. 8C
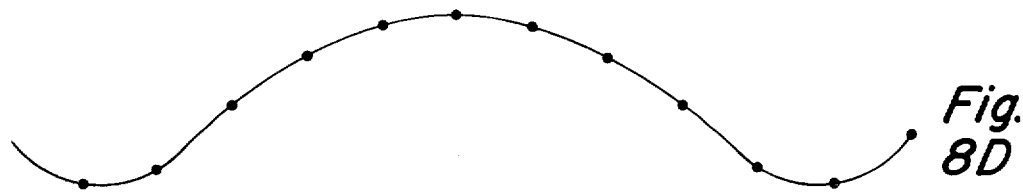
Fig. 8D

MICROPROCESSOR DATA MODEM

FIELD OF THE INVENTION

This invention relates to data communications systems and more particularly to a data modem operative to transmit and receive data over a voice grade telephone line.

BACKGROUND OF THE INVENTION

For the transmission of digital data over voice grade telephone lines or other band limited channels, data modems are known for encoding data into a form capable of transmission over the limited bandwidth line, and for the decoding of data received over such line. One class of known modems operates at a data rate of 4800 bits per second (bps) and employs differential phase shift keyed (DPSK) modulation using 8 phase modulation of an 1800 Hz carrier. The data bits are processed three at a time to form tribits, each of 8 possible tribit combinations being assigned a corresponding phase angle. One known modem operating at 4800 bps is the Bell System Model 208 in which successive binary tribits are phase shifted from the previous tribit by 45°, with a 22.5° offset provided for each of the phase angles; thus, each of the 8 possible tribits is assigned a phase angle starting at 22.5° and progressing at 45° increments to 337.5°.

SUMMARY OF THE INVENTION

In brief, this invention provides a modem having microprocessor-based signal processing and control of substantially all transmitter and receiver operations. In the transmitter section of the modem, the microprocessor is operative to scramble and Grey code data to be transmitted, to generate and control the training sequence, and to digitally synthesize the phase modulated signal which is converted by a digital to analog converter to an analog DPSK signal which can be applied to the telephone line. At the receiving end of the line, a compatible modem receiver provides demodulation of the received data for conveyance to a data sink. In the receiver section of the modem, the microprocessor is operative to coherently detect the received carrier, to provide adaptive equalization, and recovery and descrambling of received data. In addition, the microprocessor provides receiver training sequence generation and control, receiver clock phase correction, signal quality measurement and phase offset detection. In the preferred embodiment described herein, the modem is operative at 4800 bps and employs 8 phase DPSK modulation of an 1800 Hz carrier. The modem is compatible with the Bell System Model 208 and other corresponding modems.

DESCRIPTION OF THE DRAWINGS

The invention will be more fully understood from the following detailed description taken in conjunction with the accompanying drawings, in which:

FIG. 1 is a block diagram of the modem transmitter digital subsystem;

FIG. 2 is a block diagram of the modem transmitter analog subsytstem;

FIG. 8A–8D are waveforms and timing diagrams useful in illustrating operations of the modulation synthesizer;

DETAILED DESCRIPTION OF THE INVENTION

Figure 6:
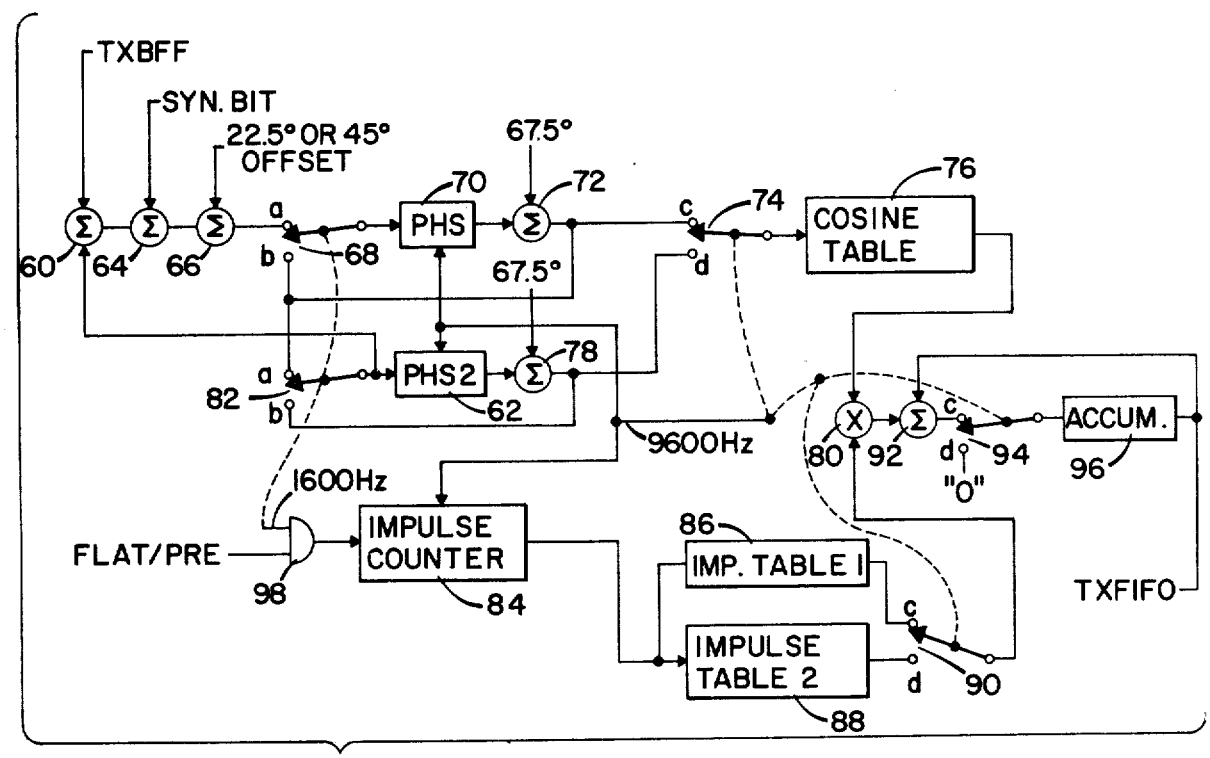
FIG. 6 is a block diagram of the modulation synthesizer.

The digital subsystem of the modem transmitter is shown in FIG. 1 and includes a microprocessor 10 having an associated crystal controlled clock 12 and a read-only-memory (ROM) 14 containing program instructions. The processor is coupled via its data bus 16 to a ROM 18 containing data tables employed during transmitter operation, in a manner to be described, and a random access memory (RAM) 20 for storage of operational data. The data bus is also coupled to a buffer 22 which receives data from a transmitter timing and interrupt control 24. The data bus also couples data to a buffer 26 and thence to a D/A converter 28 which includes an internal buffer and the output of which is a phase modulated carrier signal for application to the analog subsystem, to be described. The control circuit 24 provides a 9600 Hz reference signal to the D/A converter 28. The processor 10 provides clock signals to the control circuit 24 and provides strobe signals to the control circuit and to the buffer 26. The data to be transmitted, designated TXDATA, received from a data source is applied to the buffer 22, which also receives strap options which are manually selectable in known manner. The data source is coupled to the modem via an RS232 interface, as is known. A request to send (RTS) signal is provided by the RS232 interface to the control circuit 24, and the control circuit provides a clear to send (CTS) signal to the interface. Interface timing between the RS 232 and the control circuit is also provided.

The data from the data source is received in serial form by buffer 22, and a parallel representation of the data is conveyed via the data bus to the microcontroller 10 which provides encoding of the data to produce the eight phase differential phase shift keyed signal for transmission on the telephone line. The data bits are processed three at a time to provide tribits, each tribit being encoded into an associated one of eight possible phase angles. The microcontroller employed in the preferred embodiment is a SIGNETICS 8X300. The ROM 14 instruction memory is provided by two SIGNETICS 82S181 programmable read-only-memories (PROM), having a capacity of 1024 by 8 words. This same PROM is employed for ROM 18. The RAM 20 is implemented by two FAIRCHILD 93L422 memories having a capacity of 256 by 4 words.

The analog phase modulated signals from the D/A converter 28 are applied to the analog section of the transmitter shown in FIG. 2. The phase modulated signals are applied to a lowpass filter 30 which typically has a cut-off frequency of 3.5 KHz to remove higher frequency components caused by aliasing. The output of the lowpass filter is applied to a fixed equalizer 32 the output of which is coupled to a transmit level control 34 and thence to an output amplifier 36 which applies by way of a coupling transformer 38 the modulated signal to the telephone line. The equalizer can be bypassed by means of a switch 40 and bypass connection provided from the switch to the output of the lowpass filter.

The transmitter includes a data scrambler which combines the data to be transmitted with a pseudo-random pattern to prevent repetitive patterns and to provide a transmission sequence in which the encoded tribits are randomized to provide sufficient energy at 1600 Hz to permit proper clock recovery and sufficient randomness for the automatic-equalizer of the receiving modem. The receiving modem includes a descrambler which removes the pseudo-random pattern to recover the original data. The particular scrambling algorithm is as employed and specified for the Bell System Model 208.

Figure 3:
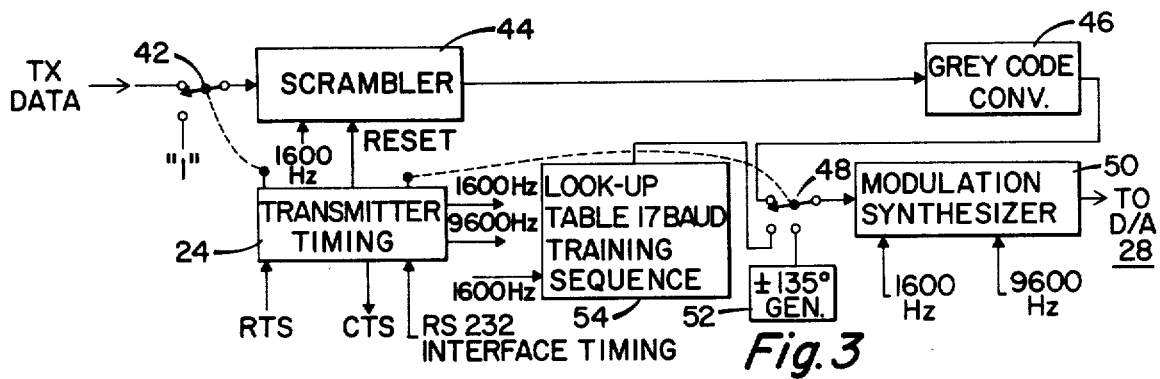
FIG. 3 is a block diagram of the data scrambler and associated portions of the digital subsystem.

Referring to FIG. 3, the transmitted data is applied via a switch 42 to a scrambler 44, the output of which is applied to a Grey code converter 46, the output of which is applied via a switch 48 to a modulation synthesizer 50. The output of the modulation synthesizer is applied to a D/A converter 28. The transmitter timing circuit 24 provides control signals for operation of the switches 42 and 48, and provides reset signals to the scrambler 44. A ±135° generator 52 provides alternating phase shifts for the initial 13 baud interval of a training cycle. A look-up table 54 which is part of ROM 18 provides a 17 baud training sequence of the data for the training cycle, as will be described. The illustrated switches are in actual implementation electronic switches provided by the processor 10. The scrambler, Grey code converter and modulation synthesizer are also implemented by the processor 10 and associated memories operating under appropriate software control.

Figure 4:
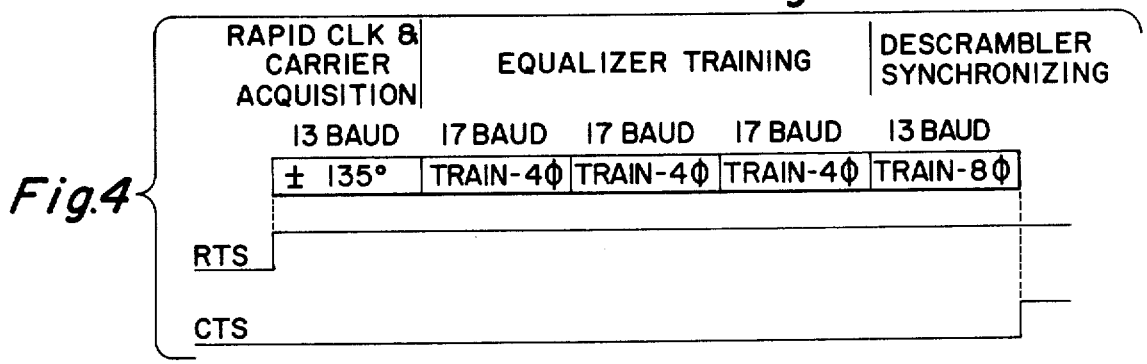
FIG. 4 is a timing diagram of the training sequence.

Prior to the transmission of data from the data source, the transmitter enters a training sequence which occurs during a period of 77 baud intervals in the manner depicted in FIG. 4. After receipt of the RTS signal, a 13 baud interval is commenced during which a carrier signal is transmitted with a differential phase shift (from generator 52) of ±135° alternately impressed thereon for purposes of clock and carrier acquisition by the receiving modem at the receiving end of the telephone line. Thus, during one baud interval, a +135° phase shifted carrier is transmitted, during the next baud interval a −135° phase shifted carrier is transmitted, and likewise for the entire 13 baud interval. For the next three 17 baud intervals, a sequence of phase shifts (from table 54) provides a test sequence of four phase data for purposes of training the adaptive equalizer in the receiving modem to achieve an intended amplitude and phase response. The training sequence produces all possible combinations of four phase codes for equalizer training and in a sequence which produces a strong clock component of 1600 Hz in the received signal. The particular sequence is compatible with the known specifications of the Bell System Model 208.

During the last 13 baud interval of the training sequence, all "ones" are provided to the scrambler and the transmitter provides eight phase test signals which are transmitted to permit synchronization of the descrambler in the receiver with the scrambler in the transmitter and to finely time the receiver equalizer. At the completion of the training sequence, the CTS signal is provided, and data from the data source is received via the RS232 interface, scrambled, Grey coded, and phase encoded for transmission on the telephone line.

Figure 5:
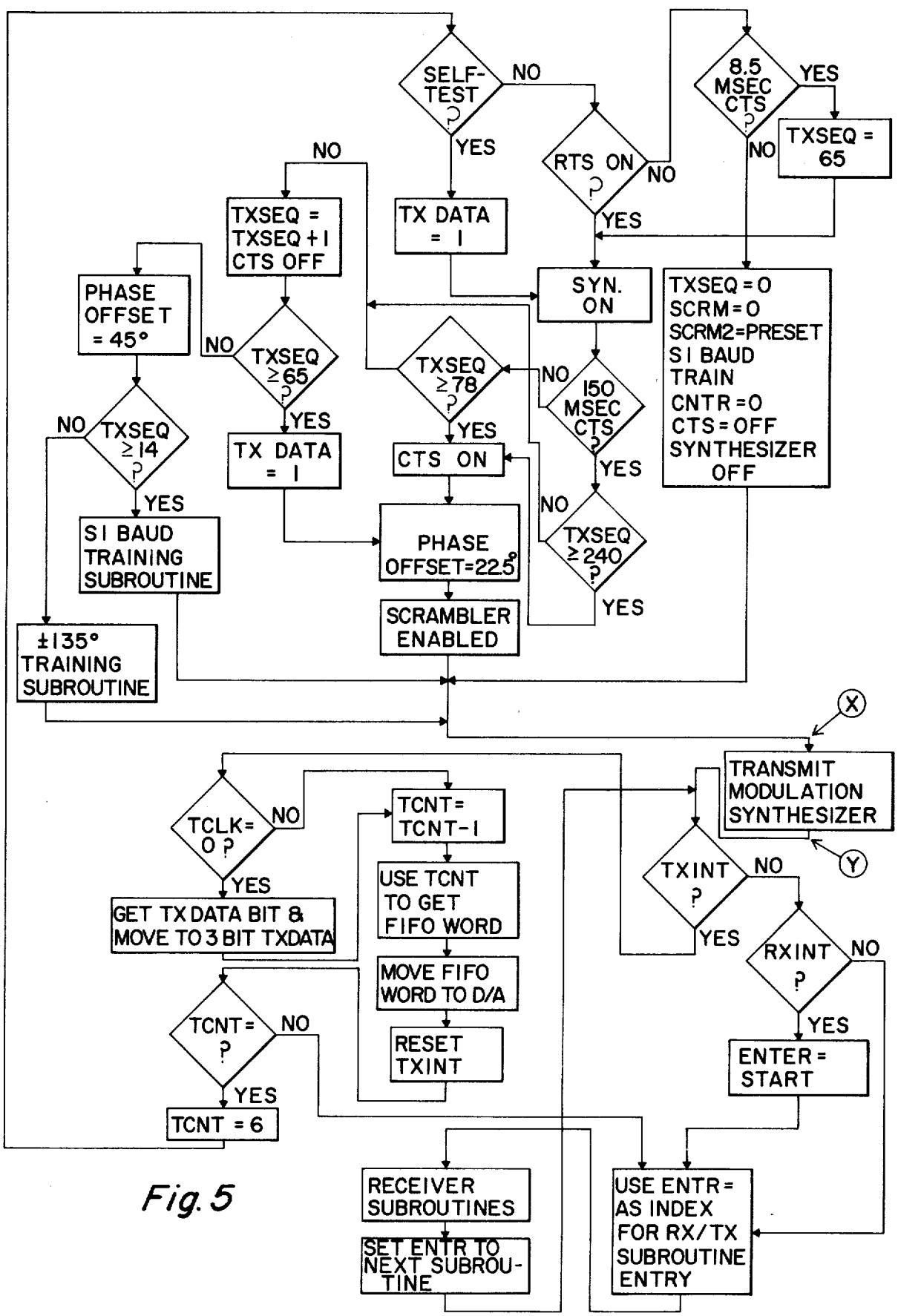
FIG. 5 is a flow chart of the digital system operation.

The digital processing and control section of the transmitter is operative in the manner shown in the flow chart of FIG. 5. The processor can also be employed for the receiver of the associated modem. The processor 10 will test for transmitter interrupts (TXINT) and receiver interrupts (RXINT) and upon receipt of an interrupt will cause a jump to an appropriate transmitter or receiver routine or subroutine. The interrupts are service requests which occur at predetermined points of the processing, and are not interrupts which necessarily cause a jump out of a routine regardless of the status of the routine. In the system described herein, a routine, once entered, is completed before a jump can occur. As seen in FIG. 5, if no transmitter interrupt is detected, a test is made for a receiver interrupt and if none is received, the routine will return to a transmitter interrupt test to determine whether or not such an interrupt has occurred. When a particular transmitter or receiver subroutine is completed, a pointer is set for the next routine that is to be entered. The flow chart of FIG. 5 identifies several software counters or registers that are employed. Transmit sequence (TXSEQ) is a counter that is employed to determine whether the transmitter should be in its training sequence or whether it should be in its data sequence. The TXSEQ counter is reset to zero when there is no request to send (RTS) command and this defines an initial starting condition. The counter identified as T count (TCNT) is employed as an index to select the particular word from the software first-in-first-out (FIFO) stack that is to be conveyed to the transmitter D/A converter 28. The TCLK is a 4800 Hz clock that is tested to determine whether data from the data interface is valid or not. If TCLK is zero, this signifies that the data from the interface is valid. If TCLK is not equal to zero, that is, TCLK is in a "one" state, there is the possibility that the data from the interface is not valid and is not to be used for transmission.

The register labelled RXENTR is employed as an index to determine which particular receiver subroutine is to be entered next and to identify whether the routine should jump back to an interrupt test. The transmitter interrupt and the receiver interrupt are reset by the particular activity or processing step. In the case of a transmitter interrupt, the interrupt is set when the D/A converter is loaded with a new data word.

A self-test decision is made as to whether or not a self-test mode is to be entered. If yes, the transmitter carrier is turned on and the transmit data (TXDATA) is forced to an all ones condition, and the RTS test is bypassed. If the self-test decision is no, a test is made to determine if RTS is on. IF RTS is on, the synthesizer will be turned on and the TXSEQ counter will be examined to determine if the count is greater than or equal to 78. If TXSEQ is greater than or equal to 78, the CTS command is sent to the data interface, the phase offset for the synthesizer is set to 22.5°, and the scrambler is enabled. The transmit data after scrambling and Grey coding is identified as TXBFF.

If TXSEQ is not equal to or greater than 78, this counter will be incremented by one count and the CTS command will be turned off, irrespective of whether or not it was previously on. A test will next be made to determine if TXSEQ is greater than or equal to 65. If yes, the TXDATA will be set to all ones and the last 13 baud interval of the training sequence will be entered to cause a phase offset of 22.5° and the transmission of eight phase test data during this interval. If TXSEQ is not equal to or greater than 65, the phase offset is set to 45° and a decision is made whether TXSEQ is greater than or equal to 14. If yes, the 51 baud training cycle composed of three 17 baud intervals, is commenced. During this cycle, a 17 count counter is sequenced three times and is used as an index to address the memory look-up table 54 (FIG. 3) that contains the training sequence phase information that is to be processed by the transmitter synthesizer. If TXSEQ is not greater than or equal to 14 the ±135° training generator is turned on to provide alternating 135° phase shifts during the intitial 13 baud interval of the training sequence.

If the self-test decision is no, a test is made to determine if the RTS signal is on. If not, the processor will determine whether the 8.5 millisecond CTS strap option is present, and if so the TXSEQ counter is set to 65 and the processor enters the final 13 baud test sequence. The synthesizer is turned on, or if already on is left on. A decision is next made whether the 150 millisecond CTS strap option is present. If not, a test is made whether TXSEQ is greater than or equal to 78, to determine whether or not the transmitter is still in the 78 baud training cycle. If the 150 millisecond CTS strap option is present, a test is made whether TXSEQ is greater than or equal to 240, since the duration of 240 bauds is 150 milliseconds. If TXSEQ is greater than or equal to 240, the CTS command is turned on (or left on) and the routine continues as described above. It the 150 millisecond CTS strap option is not present, a test is made whether TXSEQ is greater than or equal to 78 and the routine continues as described. The strap options described specify a time interval at the end of which the CTS signal is turned on to cause transmission of data from the data source. The No branch of the 150 millisecond CTS strap option test provides the 50 millisecond CTS strap option, the 50 millisecond duration being equal to 78 baud intervals.

Assume that a transmitter cycle is to be commenced and that a transmitter interrupt has occurred. At the next transmitter interrupt, the processor branches to a TCLK test. If TCLK is not equal to zero the processor will decrement the TCNT counter by one count. The TCNT contents are employed as an index offset to obtain a data word from the FIFO stack which is conveyed to the D/A converter. Loading of the D/A converter causes a reset of the transmitter interrupt. A test is then made of whether TCNT is equal to zero and if not the processor jumps to the RXENTR routine. If TCNT is equal to zero, the TCNT counter is preset to 6, and the processor then returns to the self-test mode. If TCLK is equal to zero, the processor will assemble the three serial data bits received from the data interface into a tribit of transmit data which is to be scrambled and phase encoded for transmission. The TCNT register is decremented by one count and the then TCNT is employed as an index offset to obtain a data word from the FIFO stack for loading in to the D/A converter. The data words in the FIFO stack comprise a six work stack of information which represent the six samples during a baud interval which are provided by the modulation synthesizer and which after digital to analog conversion and analog processing are transmitted on the telephone line.

Each tribit of data to be sent is encoded into an associated one of eight possible phase shifts to provide a differential phase in relation to the phase of the previously encoded tribit and includes the 22.5° offset. The phase encoding is performed by digital synthesis to provide a digital value which upon a digital-to-analog conversion is the phase modulated carrier signal of intended differential phase. The synthesizer is shown in conceptual block diagram form in FIG. 6. The data word labelled TXBFF is the scrambled and Grey coded transmit data, and is added in summer 60 with an offset representation of data in the PHS 2 register 62 applied via a switch 82. The output of summer 60 is combined in summer 64 with a synthesizer bit to provide an input to a summer 66 which sums this received data with data which represents a 22.5° phase offset during data transmission or a 45° phase offset during a training cycle. The output of summer 66 is applied via a switch 68 to a PHS register 70. The output of the PHS register is applied to a summer 72 which receives a data word representing a phase angle of 67.5°, and the output of this summer is applied by way of a switch 74 to a cosine table 76. The output of the PHS 2 register is applied to a summer 78 which also receives the 67.5° data word, and the output of summer 78 is applied via the switch 74 to the cosine table 76. The output of the cosine table is applied to one input of a multiplier 80. The output of the cosine table is applied to one input of a multiplier 80. The output of the summer 72 is applied to the second switch position of switch 68, while the output of the summer 78 is applied to the second switch position of the switch 82. The synthesizer bit is employed to address a portion of the cosine table 76 which contains "0" values for all 16 locations, thereby to control the carrier on or off.

Figure 7:
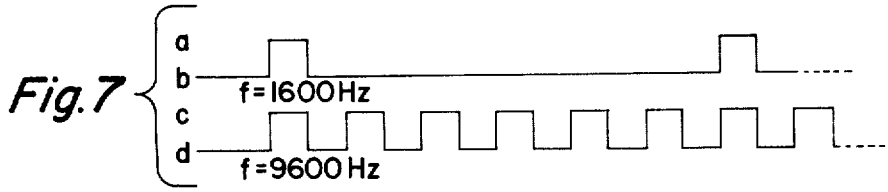
FIG. 7 is a timing diagram of clock signals employed in the modulation synthesizer.

An impulse counter 84 is provided, the output of which is applied to first and second impulse tables 86 and 88 and the respective outputs of which are coupled via a switch 90 to the second input of the multiplier 80. The output of the multiplier is applied to a summer 92, the output of which is applied via a switch 94 to an accumulator 96. The output of the accumulator is applied as a second input to the summer 92 and also provides the output data labelled TXFIFO. A clock signal at a 9600 Hz rate is applied to the registers PHS and PHS 2 and to the impulse counter 84. This clock signal is also employed to control the switches 74, 90 and 94. A clock signal at a 1600 Hz rate is employed to control the switches 68 and 82, and to provide a gating input to an AND gate 98 which receives a control signal for presetting of the impulse counter to provide a flat or pre-equalized response. The timing of the switches is illustrated in FIG. 7.

The cosine table 76 contains 16 digital cosine values, one for each succeeding 22.5° of a carrier cycle. The impulse tables 86 and 88 together contain 12 data values representing samples of the impulse response of a low-pass filter having a cutoff frequency of 800 Hz, and which response is truncated to two baud intervals. Table I includes the first six sample values which occur during the first baud interval, and table 2 contains the next six sample values which occur during the second baud interval. The cosine of the phase angle to be sent over the phone line is multiplied by the corresponding impulse table values, and the resulting product is added to the produce of the cosine of the previous phase angle and its corresponding impulse table values. The result of this computation is stored in the accumulator 96. This stored data is a digital representation of the phase modulated carrier signal to be transmitted and containing the differential phase of the tribit which has been encoded. The digitally encoded phase modulated carrier (C), which is the value stored in the accumulator, can be presented as follows:

C=COS(PHS)(IMP· Value 1)+COS(PHS 2)(IMP Value 2)

The impulse counter 84 includes six addresses for the impulse tables and these addresses are employed for addressing the respective impulse tables depending on which table is operative at the time. The impulse counter can be preset to provide a modified address for the impulse tables to provide pre-equalization of the resulting encoded data.

The waveforms and relative timing of the synthesizer are shown in FIGS. 8A-8D. FIG. 8A represents the 1800 Hz carrier. FIG. 8B represents the sampling intervals of the D/A converter which occur at a 9600 Hz rate. Thus, each sample occurs at a successive 67.5° of the carrier. FIG. 8D depicts the lowpass filter impulse response occurring over the two baud intervals PHS and PHS2 shown in FIG. 8C. The illustrated points on the impulse response curve are the sample values stored in the impulse tables.

Figure 9:
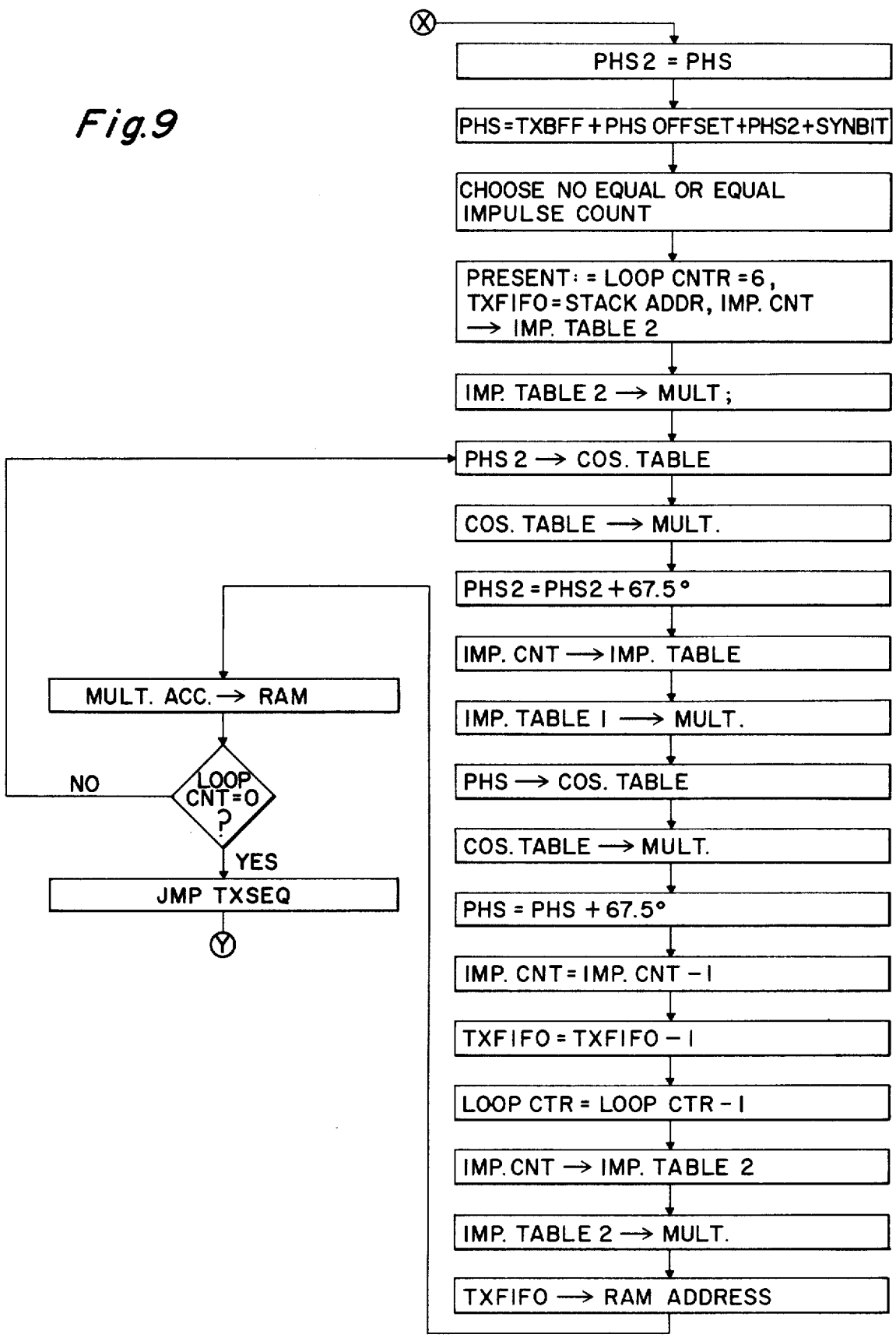
FIG. 9 is a flow chart of the modulation synthesizer.

The operation of the synthesizer is illustrated in the flow chart of FIG. 9 for encoding each baud. The data in the PHS register from the previous baud interval is moved to the PHS 2 register. The present data loaded into the PHS register is equal to the new differential phase shift TXBFF, plus the phase offset, plus the synthesizer bit. The particular equalization is selected as a preset to the impulse counter. The loop counter is set to 6, the TXFIFO register is preset to the initial stack address, and impulse table 2 is addressed with the impulse count. The addressed value from impulse table 2 is applied to the multiplier. The cosine table is addressed by the contents of the PHS 2 register, and the addressed value from the cosine table is applied to the multiplier. The multiplier which has been previously cleared is now loaded by the accumulator. The PHS 2 register is next incremented by 67.5° and impulse table 1 is addressed by the impulse count. The addressed value is table 1 is moved to the multiplier. The cosine table is next addressed by the PHS register and the addressed value is moved to the multiplier. The PHS register is incremented by 67.5° and the impulse counter is decremented by one count. The TXFIFO register is decremented by one count as is the loop counter.

Impulse table 2 is next addressed by the impulse count and the addressed value is conveyed to the multiplier. The TXFIFO register contents are then moved to the RAM address and the contents of the multiplier accumulator are moved to the RAM. A decision is then made whether the loop count is equal to zero. If yes, the routine jumps to the transmit sequence (TXSEQ). If the loop count is not equal to zero, the synthesizer routine branches back to address the cosine table with the value of the PHS 2 register, and the sequence continues as described. The data provided by the modulation synthesizer is converted by D/A converter 28 to an analog DPSK signal for transmission on the line to the receiving modem.

Figure 10:
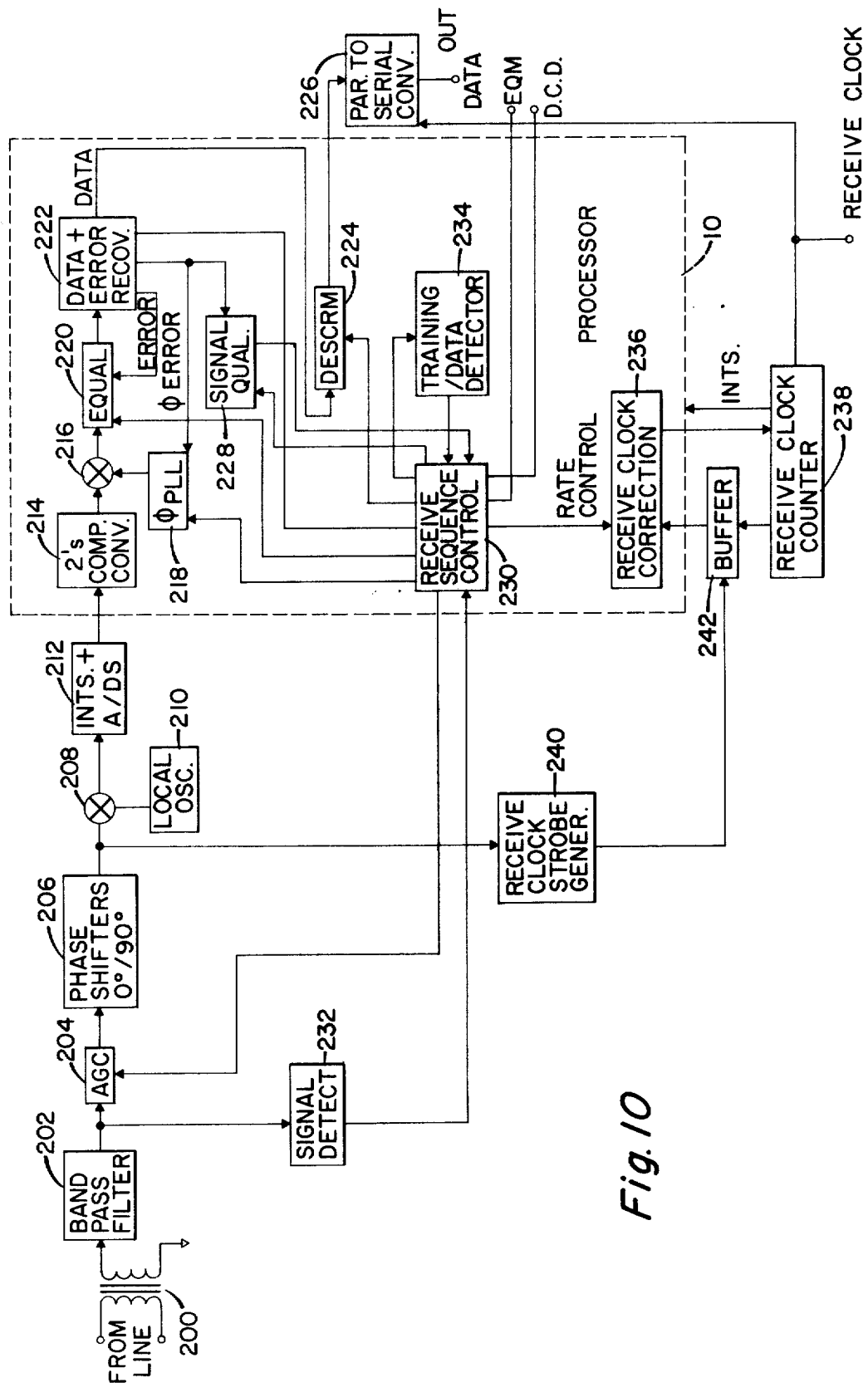
FIG. 10 is a block diagram of the modem receiver.

The modem receiver is shown in the block diagram of FIG. 10. The phase modulated signal from the line is coupled via a line transformer 200 to a bandpass filter 202 which removes spurious frequency components outside of the passband of interest. The output of the filter is applied to an automatic gain control (AGC) circuit 204 which provides a predetermined uniform output level irrespective of the varying input level from the receiving telephone line. The output signal from the AGC circuit is then provided to a pair of phase shifters 206 composed of a zero degree phase shifter and a 90° phase shifter. The phase shifters 206 provide a pair of output signals which are in quadrature phase relative to each other and these quadrature phase signals are applied, respectively, to a pair of demodulators 208 which also receive a local oscillator signal from a local oscillator 210 having a frequency of 1800 Hz to provide baseband demodulation of the received signal.

The demodulated output signals are applied, respectively, to a two channel circuit 212 which includes a pair of integrators and a pair of analog-to-digital (A/D) converters. One integrator and associated A/D converter is in an in-phase channel, while the other integrator and associated A/D converter is in an out-of-phase channel. Each A/D converter provides a parallel word which includes magnitude and sign information and these data words are applied to a 2's complement converter 214 which provides 2's complement data employed in the microprocessor. The digital outputs from the A/D converters are applied to a pair of respective demodulators 216 which receive a reference signal from a phase-lock-loop 218 which provides a local oscillator frequency such to maintain the demodulated output signals at baseband.

The signals from demodulators 216 are applied to an equalizer 220 the output signals of which are applied to a data and error recovery circuit 222 which provides an error signal to the equalizer 220, a phase error signal for the phase-lock-loop 218, and data which is applied to a descrambler 224 which unscrambles the data that was scrambled by the transmitting modem. The unscrambled data is applied three bits at a time in parallel to a parallel-to-serial converter 226 to provide the output data at a 4800 Hz rate for application to the data interface.

The phase error signal from the circuit 222 is also applied to a signal quality detector 228 which is operative to monitor signal quality, and in the event that the signal degrades to a predetermined signal-to-noise ratio, will cause an automatic retraining cycle. The receiver routines are controlled by the receive sequence control 230. Upon detection of a received carrier signal, the signal detect circuit 232 provides a control level to the receive sequence control 230 to start a receive sequence. In the absence of a received carrier signal, the signal detect circuit 232 provides a corresponding control level to reset the receive sequence control 230 and initialize associated registers used in the other receiver subroutines. A training/data detector 234 determines whether the receiver is in a data mode or a training mode, and the receive sequence control 230 provides an EQM signal which denotes whether the receiver is in data or traning mode. The receive sequence control 230 provides a rate control signal to a receive clock correction circuit 236 which provides a clock output at 4800 Hz for clocking data out to the interface.

The receive clock counter 238 is a free running counter and has its phase adjusted in accordance with strobe signals provided by a receive clock strobe generator 240 which receives input signals from the phase shifters 206. The phase of the receive clock counter 238 is thus phase adjusted to operate synchronously with the received clock information. Strobe pulses are provided by strobe generator 240 at a 1600 Hz rate, and these strobe pulses are applied to a buffer 242 which also receives data from the receive clock counter 238. The buffer output is applied to receive clock correction 236 which is operative to provide correction signals back to the receive clock counter 238. The receive clock counter 238 also provides receiver interrupts to the processor and clock signals to the converter 226 and A/D converters 212. The receive sequence control 230 also provides a delayed carrier detector (DCD) output which denotes whether data from converter 226 is valid or not.

Figure 11:
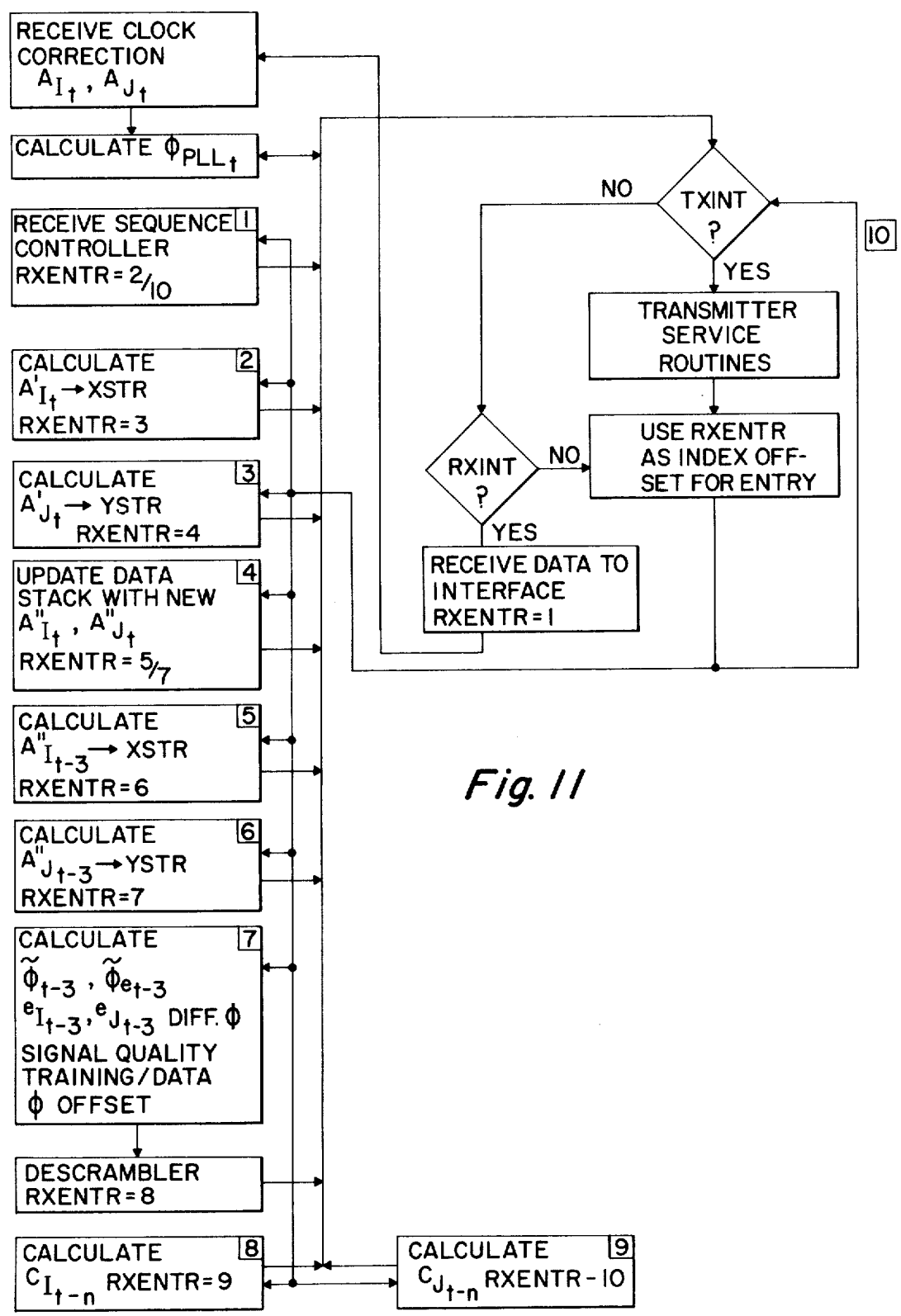
FIG. 11 is a flow chart of receiver operation.

The overall processor operation for the receiver routines is shown in FIG. 11. Each of the blocks depicted in the left hand portion of FIG. 11 shows a particular subroutine that performs an associated calculation. Assume no transmitter interrupt has occurred and that a receiver interrupt has occurred, received data is sent to the data interface and the receiver entry pointer (RXENTR) is set to 1. The processor then jumps to the receive clock correction routine and converts the sign and magnitude information from the A/D converters 212 into 2's complement form and stores the in-phase (real) and out-of-phase (imaginary) data $A_{It}$ and $A_{Jt}$. The routine next calculates the frequency and phase correction ($\phi_{PLLt}$) required to compensate for the frequency and phase translation occasioned by the telephone line. Upon completion of this calculation the routine jumps back to the interrupt sequence to determine whether a transmitter or receiver interrupt has occurred. If there is a transmitter interrupt, the processor will jump to service the transmitter routines, and then use RXENTR as an index offset to cause the processor to jump to the receive sequence controller (block 1).

If a transmitter interrupt has not occurred, the processor will test for a receiver interrupt, and since a receiver interrupt was just serviced, there cannot be another receiver interrupt and the processor again uses RXENTR as an index offset to cause the routine to jump to the receiver sequence controller (block 1). The receive sequence controller is a counter that controls which step the processor is at in a training sequence. Upon completion of the training sequence as determined by the receive sequence controller, the RXENTR is set to 2 if a carrier signal is present, and is set to 10 if no carrier signal is present. Upon completion of the block 1 routine, the processor jumps back to the interrupt sequence. If there has not been a receiver interrupt or a transmitter interrupt, the processor will jump back via the entry index offset to block 2 wherein the processor will calculate the real part of the frequency and phase correction of the input data and store the calculated value $A_{It}'$ in the X store (XSTR), and then sets RXENTR to 3, and jumps back to the transmitter and receiver interrupt test routines once again.

The processor will then jump to block 3 and calculate the imaginary part of the frequency and phase correction of the input data and store this value $A_{Jt}'$ in the Y store (YSTR). RXENTR is then set to 4 and the processor will jump back to the interrupt tests after which the processor will jump to block 4. It is noted that the processor can calculate the imaginary part of the frequency and phase correction of the input data before calculation of the real part, and the order in which such calculations are performed is a matter of design choice.

The routine of block 4 provides data required in the adaptive equalizer and provides this new data, $A_{It}''$ and $A_{Jt}''$, to a data stack. RXENTR is then set to 5 if a carrier signal is present and a training sequence has been completed. If the training sequence is in the first 13 baud interval, the receiver entry pointer is set to 7 to bypass blocks 5 and 6. The routines of blocks 5 and 6 provide the adaptive equalizer operation, but the equalizer is not employed during the first 13 baud interval of a training sequence and thus blocks 5 and 6 are not employed during this training interval. In the routine of block 5, the processor calculates the value $A_{It-3}''$ and stores this value in XSTR to replace the data previously stored therein. RXENTR is then set to 6 and the processor jumps back to the interrupt tests. After interrupt testing the processor will jump to the routine of block 6 and calculate the value $A_{Jt-3}''$ and store this value in YSTR to replace the value previously stored in that location. These values now stored are the equalizer outputs. RXENTR is set equal to 7 and the interrupt testing is again performed. It is again noted that the order in which the real and imaginary parts of the data is calculated is a matter of choice.

The routine of block 7 calculates the received phase signal $\phi_{t-3}$ out of the equalizer at a time $t-3$, which is equal to 4 baud intervals and which is equal to the delay through the equalizer to its center tap. This routine also calculates the phase error $\phi_{et-3}$, and equalizer error $e_{It-3}$ and $e_{Jt-3}$ at the $t-3$ time. This routine also calculates the received differential phase, signal quality and determines the offset (22.5° or 45°) of the data or training modes.

The routine then provides descrambling of data after which RXENTR is set to 8 and the processor again returns to the interrupt tests. Upon return to the routine of block 8, the processor calculates the real part of each coefficient $C_{It-n}$ for the equalizer. RXENTR is set to 9 and, after the interrupt testing sequence, the processor returns to block 9 to calculate the imaginary part of the coefficients $C_{Jt-n}$ for the equalizer. RXENTR is then set to 10. The order of calculation of the real and imaginary parts of the equalizer coefficients are again a matter of choice. The coefficients are calculated for the number of equalizer taps which are employed, 7 taps being employed in the illustrated embodiment; thus, the real and imaginary parts of the equalizer coefficients are determined for values of n being equal to 0 through 6. Upon completion of the routine of block 9, the processor jumps back to the interrupt tests. If there has been no transmitter interrupt and no receiver interrupt, the index offset will cause the processor to jump back and again look for a transmitter interrupt and this test loop will continue until either a transmitter interrupt or a receiver interrupt is detected.

The transmitter interrupts occur at a 9600 Hz rate which is approximately 104 microseconds. The receiver interrupts occur at a 1600 Hz rate which is 625 microseconds. The transmitter service routines take approximately 65 microseconds so that these routines are performed all at once with no reentry necessary, and the information that the transmitter service routines generate is stored in memory for outputting at the transmitter interrupt service rate. Since this transmitter interrupt service rate occurs at a 104 microsecond interval, no combination of subroutines employed in the receiver can exceed this time limit, and as a result, the timing of the particular subroutines is controlled so as not to exceed the transmitter interrupt service rate. The structured programming sequence illustrated in FIG. 11 provides a processor system architecture having a plurality of data entries and exits such that the transmitter interrupt service rate interval is not exceeded.

The listings for ROM 14 and ROM 18 are attached hereto as an appendix.

The invention is not to be limited by what has been particularly shown and described except as indicated in the appended claims.

What is claimed is:

1. A data modem comprising:
    a microprocessor having an associated clock, instruction memory, a memory containing data tables, and a memory for storage of operational data;
    a data bus for coupling the microprocessor to said memories, for coupling control and data signals to the microprocessor, and for coupling data from the microprocessor;
    a transmitter section having a digital subsystem provided by said microprocessor and associated data bus and memories and operative to encode data from a source into DPSK form;
    the transmitter section having an analog subsystem operative to convert the encoded data into an analog DPSK signal for transmission on a voice grade line;
    the transmitter section including:
    means operative to couple via the data bus a representation of data from said source to said microprocessor;
    digital-to-analog converter means operative in response to digital data coupled thereto by the data bus from the microprocessor to provide the analog signal;
    timing and interrupt control means operative to provide timing and control signals via the data bus for the microprocessor;
    said microprocessor being operative to provide a training sequence, to scramble data to be transmitted, to digitally synthesize the DPSK signal and to control transmitter operation;
    a receiver section including an analog subsystem operative to receive a DPSK signal from a voice grade line and a digital subsystem provided by the microprocessor and associated data bus and memories, and operative to convert the received analog signal into digital form and to decode the data; and
    said microprocessor being operative to provide coherent detection of the received signal, adaptive equalization, data recovery, descrambling of data, receiver training sequence generation and control, clock phase correction, signal quality measurement, and phase offset detection.

2. The data modem of claim 1 wherein the analog subsystem of the receiver section includes:
    input means for receiving the DPSK signal from the line;
    band pass filter means operative to remove spurious frequency components outside of the frequency band of interest;
    an automatic gain control circuit providing a uniform output level irrespective of varying input level from the receiving line;
    phase shifting means operative to provide a pair of quadrature phase signals;
    first demodulator means operative to provide a pair of first demodulated signals; and
    analog-to-digital converter means operative in response to the demodulated signals to provide digital representations of the first demodulated signals.

3. The data modem of claim 2 wherein the digital subsystem of the receiver section includes:
    digital demodulator means operative in response to the digital representations of the first demodulated signals to provide demodulated output signals;
    a descrambler operative to unscramble the scrambled data received from the line; and
    converter means operative to provide serial output data for application to utilization apparatus.

4. The data modem of claim 1 wherein said microprocessor provides an interrupt test routine to determine whether a transmitter interrupt or a receiver interrupt has occurred and including an entry pointer for selection of the next routine to be processed; and
    a plurality of receiver routines each operative to provide calculation of corresponding parameters of a receiver signal processing sequence within the transmitter interrupt service rate interval.

5. The data modem of claim 4 wherein the receiver means of said microprocessor is operative according to the flow chart of FIG. 11.

6. The data modem of claim 1 wherein the digital subsystem of the transmitter section is operative according to the flow chart of FIG. 5.

7. A data transmitter comprising:
    a microprocessor having an associated clock and read-only instruction memory;
    a read-only memory containing data tables coupled via a data bus to said microprocesor;
    a random-access memory for storage of operational data and coupled via said data bus to said microprocessor;
    buffer means operative to receive data to be transmitted and to couple a representation of said data to said microprocessor via said data bus;
    digital to analog converter means operative to receive digital data from said microprocessor via said data bus and to provide a DPSK analog signal;
    timing and interrupt control means operative to provide timing and control signals for said transmitter;
    said microprocessor being operative to provide a training sequence, to scramble data to be transmitted, to digitally synthesize the DPSK signal and to control transmitter operation; and
    analog means operative in response to the analog output of said converter means to provide a DPSK signal for transmission on a voice grade line.

8. The data transmitter of claim 7 wherein said microprocessor means operative to digitally synthesize the DPSK signal includes:
    first memory means for storing a plurality of digital representations of all possible phases to be transmitted;
    second memory means for storing a plurality of digital values representing samples of the impulse response of a lowpass filter; and
    means for processing the data in said first and second memory means to provide digital representations of the phases to be transmitted.

9. The data transmitter of claim 7 wherein the digital synthesizer is operative according to the flow chart of FIG. 9.

10. The data transmitter of claim 7 wherein said read-only memory includes:
    a cosine table containing 16 digital values, each representing a succeeding 22.5° of a carrier cycle; and
    an impulse table containing 12 digital values representing samples of the impulse response of a lowpass filter having a cutoff frequency of 800 Hz, and which response is truncated to two baud intervals, the first 6 digital values being for the first baud interval, the next 6 digital values being for the second baud interval.

11. The data transmitter of claim 7 wherein said analog means includes:

lowpass filter means operative to remove higher frequency components outside a predetermined frequency range;

equalizer means; and output means operative to provide the analog DPSK signal to the voice grade line;

switch means for selectively bypassing the equalizer means to apply the signal from the filter means directly to the output means.

12. The data transmitter of claim 7 wherein said microprocessor includes:

a scrambler operative to scramble data to be transmitted;

a Grey code converter receiving scrambled data from the scrambler;

a modulation synthesizer operative to produce digital representations of the phases to be transmitted and to provide these digital representations to the digital-to-analog converter means.

* * * * *

UNITED STATES PATENT AND TRADEMARK OFFICE
CERTIFICATE OF CORRECTION

PATENT NO. : 4,263,670
DATED : April 21, 1981
INVENTOR(S) : James B. Sherman

It is certified that error appears in the above—identified patent and that said Letters Patent is hereby corrected as shown below:

Column 1, line 64, "subsytstem;" should read --subsystem;--.

Column 2, line 5, "FIG." should read --FIGS.--;

line 42, "RS 232" should read --RS232--.

Column 7, line 1, "C=COS(PHS)(IMP·" should read

--C=COS(PHS)(IMP.--;

line 17, "PHS2" should read --PHS 2--.

Column 9, line 64, "$A_{Jt}'$," should read --$A_{Jt}''$,--.

Column 12, line 27, "microprocesor;" should read

--microprocessor;--.

Signed and Sealed this

First Day of December 1981

[SEAL]

Attest:

GERALD J. MOSSINGHOFF

Attesting Officer       Commissioner of Patents and Trademarks